(12) United States Patent
Chang et al.

(10) Patent No.: US 9,160,904 B1
(45) Date of Patent: Oct. 13, 2015

(54) GANTRY OBSERVATION FEEDBACK CONTROLLER

(75) Inventors: Samuel Henry Chang, San Jose, CA (US); Yuhua Zhu, Fremont, CA (US); Prasanna Venkatesh Krishnasamy, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 393 days.

(21) Appl. No.: 13/612,113

(22) Filed: Sep. 12, 2012

(51) Int. Cl.
*H04N 5/225* (2006.01)

(52) U.S. Cl.
CPC .................................. *H04N 5/2251* (2013.01)

(58) Field of Classification Search
USPC ................. 348/207.99; 356/139.03
See application file for complete search history.

(56) References Cited

U.S. PATENT DOCUMENTS

| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 2004/0196451 | A1* | 10/2004 | Aoyama .................. 356/139.03 |
| 2012/0223885 | A1 | 9/2012 | Perez |

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Roberto Velez
*Assistant Examiner* — Stephen Coleman
(74) *Attorney, Agent, or Firm* — Lee & Hayes, PLLC

(57) ABSTRACT

A calibration module may acquire calibration data for calibrating rotations of augmented reality functional node. The calibration module scans a target, records pose data for the augmented reality functional node, and captures images of the scanned target. From these acquired images, calibration may be determined. Once determined, the calibration may be used to determine a rotator control model.

23 Claims, 9 Drawing Sheets

GANTRY OBSERVATION FEEDBACK CONTROLLER

BACKGROUND

Movable platforms with image sensors and/or light projectors may be used for a variety of applications, including human-machine interfaces, augmented reality environments, gaming, metrology, and so forth. These applications typically benefit from calibrating the movement of the platforms.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes systems and techniques for calibrating a movable platform that projects light onto a display medium and that captures images.

In some embodiments, the movable platform projects light onto a target. The movable platform may be placed in multiple positions and may scan projected light across the target to illuminate a sequence of target locations at the multiple positions. Pose data for the multiple positions of movable platform may be recorded, in which the pose data may comprise orientation data of the movable platform during the scan of the target. An image of the target may be acquired by the movable platform, and the image may indicate the sequence of target locations. The image and the pose data may comprise calibration data that may be employed for calibrating movements of the movable platform.

Illustrative Environment

Figure 1:
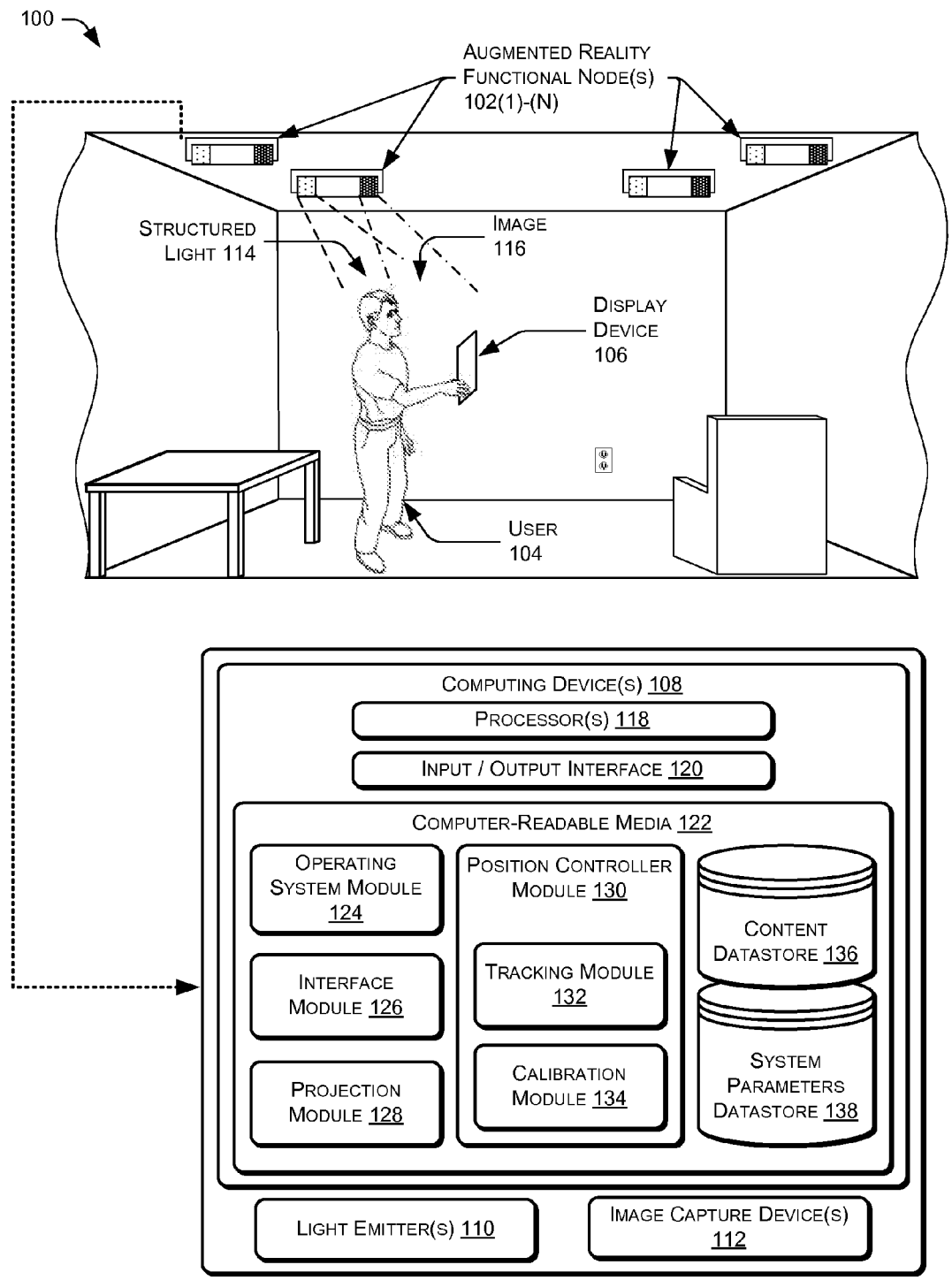
FIG. 1 illustrates an environment that includes an augmented reality functional node (ARFN) and a user that may interact with the ARFN.

FIG. 1 shows an illustrative augmented reality environment 100 in which the described techniques may be performed. The environment 100 includes one or more augmented reality functional nodes (ARFNs) 102(1), ..., 102(N) (collectively referred to as "the ARFN 102" in some instances). While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices.

As illustrated, a user 104 may hold a display medium 106 and use the display medium 106 to consume content. The content may be provided to the display medium 106 by one or more ARFNs 102.

As illustrated, each ARFN 102 may include one or more computing devices 108, as well as one or more light projectors 110 that, when active, project content onto display medium 106. The light projector 110 may comprise an incandescent, fluorescent, or solid-state device.

In some instances, the ARFNs 102 may project content onto any surface within the environment 100. The projected content may include electronic books, videos, images, interactive menus, or any other sort of visual content. For instance, the user within the environment may request that the ARFN 102 project a particular electronic book that the user wishes to read. In response, the ARFN 102 may project the book onto the display medium 106 within the environment. In another example, the user may request that the ARFN 102 project a particular movie or show that the user wishes to watch. In response, the ARFN 102 may obtain the content (locally or remotely) and may project the content onto a surface in the environment.

As discussed in further detail below, the ARFN 102 may include one or more image sensors 112 configured to generate images from visible light, non-visible light, or both. For example, in one implementation the image sensors 112 may be configured to generate a thermal image as well as a visible light image. The image sensors 112 may include an imaging element such a charge-coupled device (CCD), complementary metal-oxide semiconductor (CMOS), microbolometer array, and so forth. The image sensors 112 may include one or more optical elements such as lenses, prisms, mirrors, and so forth.

The image sensors 112 may capture images 116 of an illuminated target and/or of a target with one or more markers disposed thereon. The markers may correspond to locations of incident light from the light projector 110. The image sensors 112 may also capture images of the illustrated user operating a user interface and, in response, the ARFN 102 may provide feedback to the user and may cause performance of actions corresponding to the user's selection.

In this example, one of the ARFNs 102 within the environment is shown to project structured light 114 onto the display medium 106. In addition, the ARFN may capture one or more images 116 within the environment for, among other things, calibrating movement of the ARFNs 102.

As illustrated, the computing device 108 of the example ARFN 102 includes one or more processors 118, an input/output interface 120, and computer-readable media 122. The processors 118 may be configured to execute instructions, which may be stored in the computer-readable media 122 or in other computer-readable media accessible to the processors 118.

Figure 2:
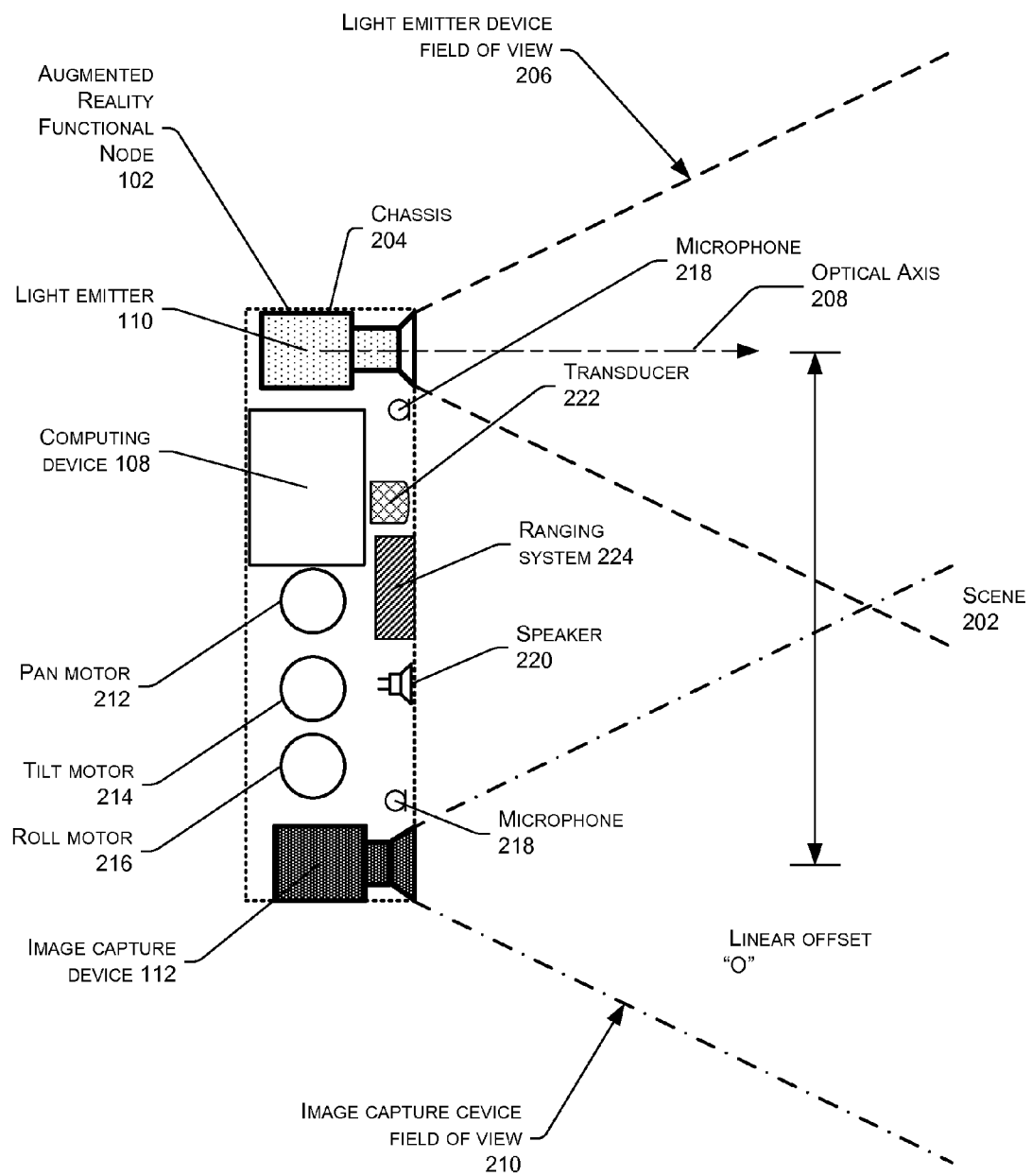
FIG. 2 illustrates an example ARFN that includes a computing device, a light projector, an image sensor, and other selected components.
Figure 3:
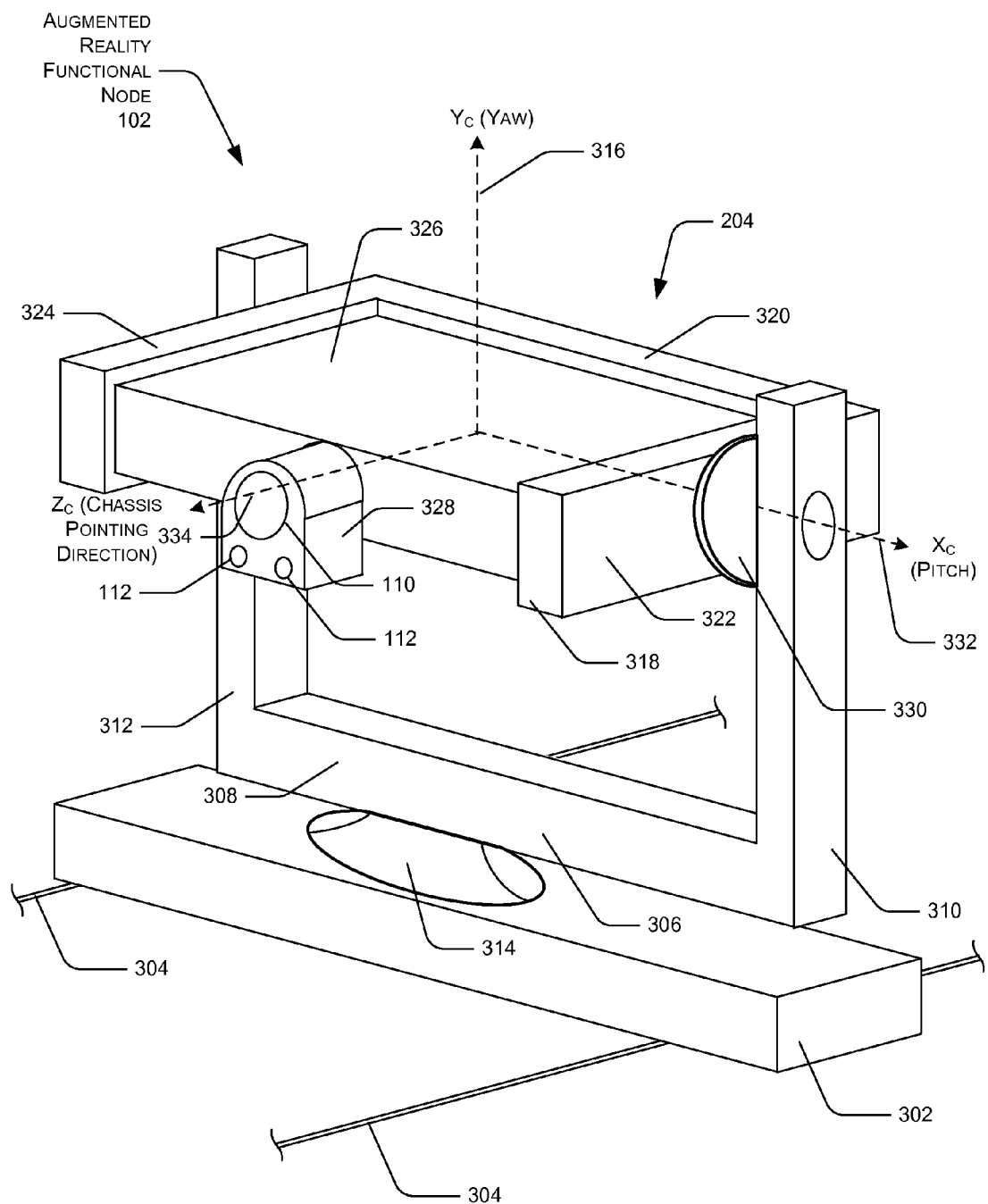
FIG. 3 is an example isometric diagram of the ARFN.

The input/output interface 120, meanwhile, may be configured to couple the computing device 108 to other components of the ARFN 102, such as the light projector 110, the image sensor 112, microphones, other ARFNs 102, other computing devices, and so forth. The coupling between the computing device 108 and the devices may be via wire, fiber optic cable, wireless connection, or the like. Furthermore, while FIG. 1 illustrates the computing device 108 as residing within a housing of the ARFN 102, some or all of the components of the computing device 108 may reside at another location that is operatively connected to the ARFN 102. In still other instances, certain components, logic, and/or the like of the computing device 108 may reside within the light projector 110 or the image sensor 112. Therefore, it is to be appreciated that the illustration of the ARFN 102 of both FIGS. 1, 2 and 3 is for illustrative purposes only, and that components of the ARFN 102 may be configured in any other combination and at any other location.

The computer-readable media 122, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 108. The computer-readable media 122 may reside within a housing of the ARFN, on one or more storage devices accessible on a local network, on cloud storage accessible via a wide area network, or in any other accessible location.

The computer-readable media 122 may store several modules, such as instructions, datastores, and so forth that are configured to execute on the processors 118. For instance, the computer-readable media 122 may store an operating system module 124, an interface module 126, a projection module 128, a position controller module 130, which may include a tracking module 132 and a calibration module 134. The computer-readable media 122 may also store a content datastore 136, and a system parameters datastore 138.

The operating system module 124 may be configured to manage hardware and services within and coupled to the computing device 108 for the benefit of other modules. The interface module 126 may also be configured to receive and interpret commands received from users within the environment 100.

Among other things, the position controller module 130 may provide control signals for panning and tilting the light projector 110 and/or the image sensor 112. In some instances, the ARFN 102 may be movable such that the ARFN 102 may be translated and rotated (for panning and tilting), and in such instances, the position controller module 130 may also provide control signals for translating and rotating the ARFN 102 from one position to another.

The tracking module 132 may track a target such as the display medium 106. The tracking module 132 may track a location of a reference point of a target. For example, the tracking module 132 may track a center point of the display medium 106. In some instances, the tracking module 132 may track multiple reference points of a target and determine an orientation and a location of the target.

The calibration module 134 may calibrate movement of the ARFN 102 such that structured light 114 emitted from the light projector 110 is incident on a target location, e.g., a center point of the display medium 106. The calibration module 134 may cause the light projector 110 to illuminate at least a portion of a target and may cause the image sensor 112 to acquire an image of at least the illuminated portion of the target. The calibration module 134 may determine a mathematical model for controlling movement of the ARFN 102 based at least on the captured image.

In some instances, the calibration module 134 may cause the light projector 110 to illuminate different portions of the target as ARFN 102 is moved. For example, the ARFN 102 may be panned such that light emitted from the light projector 110 is moved across the target in a first direction, and/or the ARFN 102 may be tilted such that light emitted from the light projector 110 is moved across the target in a second direction. As another example, the ARFN 102 may be panned and tilted such that light emitted from the light projector 110 is moved across the target in a third direction.

In some instances, the calibration module 134 may acquire a series of images in which each of the images shows one or more portions of the target illuminated by the light projector 110 as the light projector 110 is scanned over the target. The calibration module 134 may determine a mathematical model for controlling movement of the ARFN 102 based at least on the series of captured images.

In some instances, the calibration module 134 may acquire an image in which the image shows multiple portions of the target illuminated by the light projector 110 as the light projector 110 is scanned over the target. The calibration module 134 may determine a mathematical model for controlling movement of the ARFN 102 based at least on the captured image.

The content datastore 136, meanwhile, stores content for outputting within the environment. For instance, the content datastore may store applications and data for use within the environment 100. The projection module 128 may access the content datastore 136 in order to project requested content within the environment 100. For instance, when the user requests that the ARFN 102 project a particular electronic book, the projection module 128 may access the content datastore 136 to retrieve and cause projection of the desired electronic book.

The system parameters datastore 138 may maintain information about the state of the computing device 108, the light projector 110, the image sensor 112, and so forth. For example, and as described in detail below, the ARFN 102 may be configured to pan and tilt for the purpose of allowing the light projector 110 and the image sensor 112 to access different projection surfaces in the environment 100. As such, the system parameters maintained in the datastore 138 may include current pan and tilt settings of the image sensor and light projector, an indication of content that the ARFN 102 is currently projecting or otherwise outputting, and the like. The datastore 138 may further store current target location information for the projection module 128 in which the current target location information corresponds to a current location of a target (e.g., display medium 106). The datastore 138 may also store the mathematical model for controlling movement of the ARFN 102.

Illustrative ARFN

FIG. 2 shows additional details of an example ARFN 102 that may be configured to, among other things, project content, as described above with reference to FIG. 1. The ARFN 102 is configured to scan at least a portion of a scene 202 and the objects therein. The ARFN 102 may also be configured to provide output, such as images, sounds, and so forth.

A chassis 204 holds the components of the ARFN 102. One or more light projectors 110 may be disposed within the chassis 204 and may be configured to generate and project images into the scene 202. These images may be visible light images perceptible to the user, visible light images imperceptible to the user, images with non-visible light, or a combination thereof. The light projector 110 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The light projector 110 has a light projector field of view 206, which describes a particular solid angle centered on an optical axis 208. The light projector field of view 206 may vary according to changes in the configuration of the light projector. For example, the light projector field of view 206 may narrow upon application of an optical zoom to the light projector.

One or more image sensors 112 may also be disposed within the chassis 204. The image sensor 112 is configured to image the scene in visible light wavelengths, non-visible light wavelengths, or both. The image sensor 112 has an image sensor field of view 210 that describes a particular solid angle. The image sensor field of view 210 may vary according to changes in the configuration of the image sensor 112. For example, an optical zoom of the image sensor may narrow the image sensor field of view 210.

In some implementations, a plurality of image sensors 112 may be used. For instance, one embodiment of the ARFN 102 the image sensors 112 may include a three-dimensional (3D), infrared (IR) camera and a red-green-blue (RGB) camera. The 3D, IR camera may be configured to capture information for detecting depths of objects within the scene 202, while the RGB camera may be configured to detect edges of objects by identifying changes in color within the scene 202. In some instances, a single camera may be configured to perform these functions.

The chassis 204 may be coupled, via an actuator, to a fixture such that the chassis 204 may move. Actuators may include piezoelectric actuators, motors, linear actuators, and other devices configured to displace or move the chassis 204 or components therein such as the light projector 110 and/or the image sensor 112. For example, in one implementation the actuator may comprise a pan motor 212, a tilt motor 214, a roll motor 216, and so forth. The pan motor 212 is configured to rotate the chassis 204 in a yawing motion. The tilt motor 214, meanwhile, is configured to change the pitch of the chassis 204. The roll motor 216 is configured to move the chassis 204 in a rolling motion. By panning, tilting, and/or rolling the chassis 204, different views of the scene may be acquired and/or the ARFN 102 may project structured light 114 onto the display medium 106 (or any surface) while the display medium 106 is being moved. The pan motor 212, tilt motor 214 and roll motor 216 receive control signals from the position controller module 130.

One or more microphones 218 may be disposed within the chassis 204, or elsewhere within the scene 202. These microphones 218 may be used to acquire input from the user 104, which may be used to determine the location of a sound, or may be used to otherwise aid in the characterization of and receipt of input from the scene. For example, the user 104 may make a particular noise, such as a tap on a wall or snap of the fingers, which are pre-designated as attention command inputs. The user 104 may alternatively use voice commands. Such audio inputs may be located within the scene using time-of-arrival differences among the microphones and used to summon an active zone within the augmented reality environment.

One or more speakers 220 may also be present to provide for audible output. For example, the speakers 220 may be used to provide output from a text-to-speech module or to playback pre-recorded audio.

A transducer 222 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

The ARFN 102 may also include a ranging system 224. The ranging system 224 is configured to provide distance information from the ARFN 102 to a scanned object or a set of objects. The ranging system 224 may comprise radar, light detection and ranging (LIDAR), ultrasonic ranging, stereoscopic ranging, and so forth. In some implementations the transducer 222, the microphones 218, the speaker 220, or a combination thereof may be configured to use echolocation or echo-ranging to determine distance and spatial characteristics.

In this illustration, the computing device 108 is shown within the chassis 204. However, in other implementations all or a portion of the computing device 108 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

FIG. 2 also illustrates a light projector/image sensor linear offset designated as "O". This is a linear distance between the light projector 110 and the image sensor 112. Placement of the light projector 110 and the image sensor 112 at a distance "O" from one another may aid in the recovery of 3D structured light data from the scene. The known light projector/image sensor linear offset "O" may also be used to calculate distances, dimensioning, and otherwise aid in the characterization of objects within the scene 202. In other implementations the relative angle and size of the light projector field of view 206 and image sensor field of view 210 may vary. Also, the angle of the light projector 110 and the image sensor 112 relative to the chassis 204 may vary.

In other implementations, the components of the ARFN 102 may be distributed in one or more locations within the environment 100. As mentioned above, microphones 218 and speakers 220 may be distributed throughout the scene. The light projector 110 and the image sensor 112 may also be located in separate chasses 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Illustrative Chassis

FIG. 3 is an isometric view of an illustrative ARFN 102. The chassis 204 may be a gentry-type platform having a base 302. The base 302 may be coupled to tracks 304, which may be disposed on a surface of the environment 100. In some instances, the tracks 304 may be disposed on a generally vertical surface such as a wall. In other instances, the tracks 304 may be disposed on a generally horizontal surface such as a ceiling. The base 302 may include the roll motor 216, which may drive the chassis 204 along the tracks 304.

The chassis 204 may also include a support member 306. The support member 306 may be generally U-shaped having a transverse member 308 extending between opposed first and second arms 310 and 312, respectively. The first and second arms, 310 and 312, may extend outward from the transverse member 308 in a direction that is away from the base 302.

A rotatable coupler 314 may couple the base 302 to the transverse member 308 of the support member 306. The rotatable coupler 314 may be driven by the pan motor 212 to rotate the support member 306 about an axis of rotation 316 (also denoted as the "$Y_C$" axis and as the "Yaw" axis) for the chassis 202. In the instant illustration, the rotatable coupler 314 may rotate and counter-rotate the support member 306. In the following discussion, a mid-point between a maximum rotation and a maximum counter-rotation about the Y-axis 316 will be considered as a zero point.

The chassis 204 may also include a cross member 318. The cross member 318 may be coupled to the support member 306 between arms 310 and 312. The cross member 318 may carry the light projector 110 and image sensor(s) 112. In some instances, the cross member 318 may be generally U-shaped having a transverse member 320 extending between opposed first and second arms 322 and 324, respectively. The first and second arms, 322 and 324, may extend outward from the transverse member 320.

In the instant illustration, the cross member 318 includes a housing 326 that is positioned between the first and second arms, 322 and 324. The housing 326 may include components of the ARFN 102 such as, but not limited to, computing device 108. The housing 326 may have an optics platform 328 attached thereto, which may include the light projector(s) 110 and image sensor(s) 112. However, in some embodiments, the cross member 318 and the housing 326 may be a unitary body, and similarly, in some embodiments, the housing 326 and the optical platform 328 may be a unitary body that may be coupled to the cross member 318 and/or may be a unitary body with the cross member 318.

The cross member 318 is rotatably coupled to the support member 306 at arms 310 and 312 by a rotatable coupler 330. The rotatable coupler 330 may be driven by the tilt motor 214 to rotate the cross member 318 about an axis of rotation 332 (also denoted as the "$X_C$" axis and as the "Pitch" axis) for the chassis 202. In the instant illustration, the rotatable coupler 330 may rotate and counter rotate the cross member 318. In the following discussion, a mid-point between a maximum rotation and a maximum counter-rotation about the X-axis 332 will be considered as a zero point.

The $X_C$-axis 332 and the $Y_C$-axis 316 are orthogonal and may be used to define, by a mathematical rule known as the "right-hand rule," a third axis, which is referred to as the $Z_C$-axis 334 or the "chassis pointing direction." In the instant illustration, the $X_C$-axis 332 and the $Y_C$-axis 316 are shown with zero rotation about either the $X_C$-axis 332 or the $Y_C$-axis 316. The $X_C$-, $Y_C$-, $Z_C$-axes, 332, 316 and 334, respectively, represent a coordinate system of the chassis 204.

Illustrative Optical Alignment

Figure 4A:
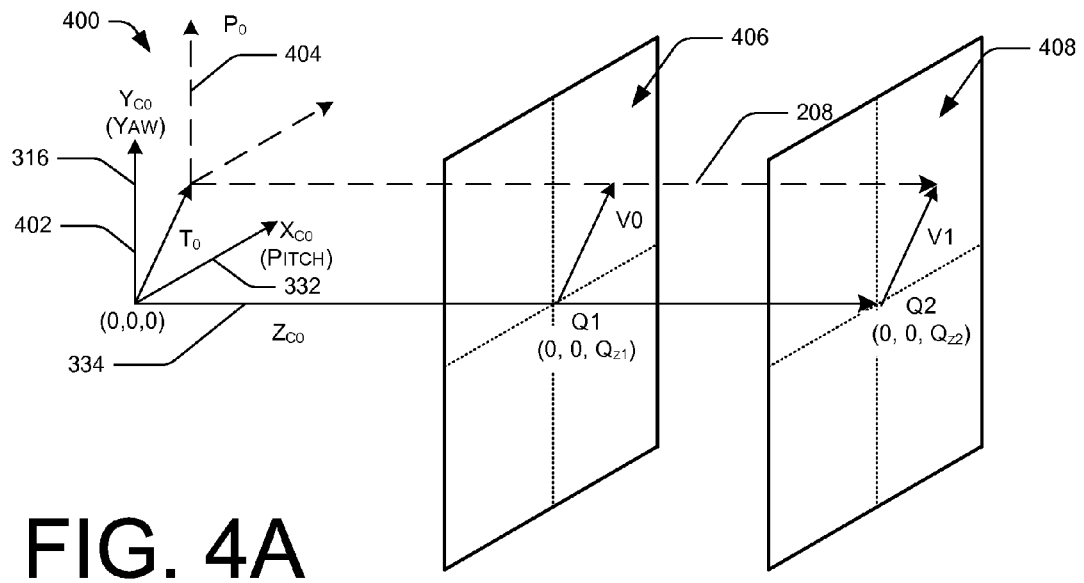
FIGS. 4A-4C illustrate optical alignment of the ARFN in various poses.
Figure 4B:
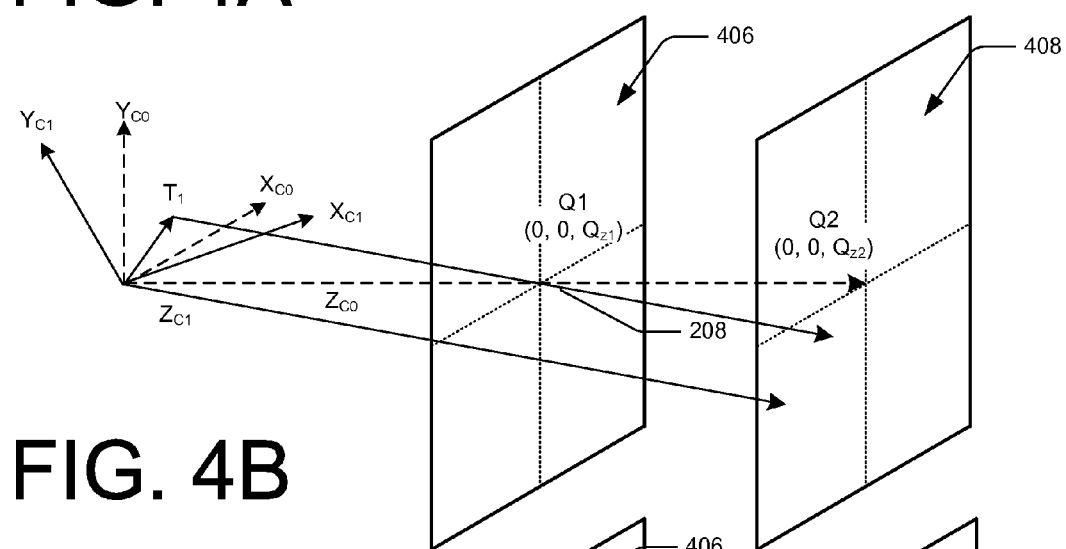
Figure 4C:
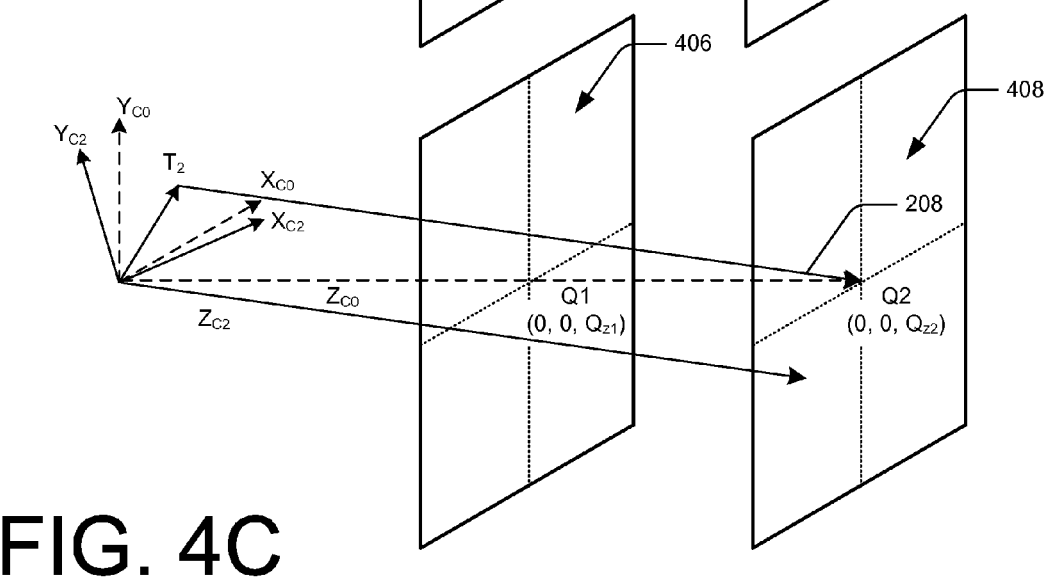

FIGS. 4A-4C illustrate optical alignment of the ARFN 102 in various poses.

When the user 104 is using the display medium 106, the tracking module 132 may determine a current location of the display medium 106. The tracking module 132 may, in some instances, also determine an orientation of the display medium 106. The tracking module 132 may determine a current distance that the display medium 106 is separated from the chassis 204 (or from the origin of the chassis coordinate system 402). When the user 104 moves the display medium 106 to a new location, the tracking module 132 may determine a displacement vector representing the change in location. The position controller module 130 may determine control signals for panning and/or tilting (and/or translating) the light projector 110 such that the light projector 110 is aimed at an intended target location (e.g., the center point) of the display medium 106. As illustrated in FIGS. 4A-4C, the controller module 130 may align the $_{ZC}$-axis 334 to point at aiming location that is offset from the intended target location or such that the optical axis 208 of the light projector 110 is pointed at the intended target location (e.g., the center point) of the display medium 106.

In the illustration of FIG. 4A, a chassis coordinate system 402 in which the $X_C$-axis 332, the $Y_C$-axis 316 and the $Z_C$-axis 334 are shown with zero rotation about either the $X_C$-axis 332 or the $Y_C$-axis 316 and are denoted as $X_{C0}$, $Y_{C0}$, $Z_{C0}$, respectively. A light projector coordinate system 404 for the light projector 110 is denoted by $P_0$, and a translation vector $T_0$ ($T_0=(T_{x0}, T_{y0}, T_{z0})^T$) represents the translation from the origin (0, 0, 0) of the chassis coordinate system 402 to the origin of the light projector coordinate system 404. The light projector coordinate system 404 is selected such that one of the axes of the light projector coordinate system 404 is coincident with the optical axis 208 of the light projector 110.

Rectangles 406 and 408 each represent a surface such as the display device 104 and/or a target having a center that is located at coordinates $Q_1$ and $Q_2$, respectively. In the instant illustration, rectangles 406 and 408 are aligned parallel to the $X_{C0}$-$Y_{C0}$ plane of the chassis coordinate system 402 with their respective centers located along the $Z_{C0}$-axis 334.

In the interest of clarity, the optical axis 208 of the light projector 110 is shown as being parallel to the $Z_{C0}$-axis 334. However, aspects of this disclosure are not limited to such arrangement. The distance between the center of the light projector 110 and the rectangle 406 ($d=|Q_{Z1}-T_{Z0}|$) may represent a minimum distance for the light projector field of view 206, and the distance between the center of the light projector 110 and the rectangle 408 ($d=|Q_{Z2}-T_{Z0}|$) may represent a maximum distance for the light projector field of view 206.

$V_0$ represents a vector from the center of the rectangle 406 to where the optical axis 208 intersects the rectangle 406, and $V_1$ represents a vector from the center of the rectangle 406 to where the optical axis 208 intersects the rectangle 408. In this instance, $V_0=V_1=(T_{x0}, T_{y0}, 0)$ because the optical axis 208 is parallel to the $Z_{C0}$-axis 334 and the rectangles 406 and 408 are arranged perpendicular to the $Z_{C0}$-axis 334 with their respective centers on the $Z_{C0}$-axis 334.

When the light projector 110 is offset from the origin of the chassis coordinate system 402 and the $Z_{C0}$-axis 334 is aligned with the centers of the rectangles 406 and 408, the optical axis 208 of the light projector 110 is not pointed at the centers of the rectangles 406 and 408. Thus, the position controller module 130 may provide control signals to one or more of the pan motor 212, tilt motor 214, and roll motor 216 to aim the optical axis 208 at the intended target location (e.g., the center of rectangle 406 or the center of rectangle 408).

In FIG. 4B the axes $X_{C1}$, $Y_{C1}$, and $Z_{C1}$ represent the axes $X_{C0}$, $Y_{C0}$, and $Z_{C0}$, respectively, after the cross member 318 and the support member 306 are rotated by $U_{X1}$ and $U_{Y1}$, respectively, which may be denoted in vector notation as $U_1=(U_{X1}, U_{Y1})^T$. $T_1$ represents the translation vector $T_0$ after the rotation. The rotation $U_1$ results in the optical axis of the light projector 110, represented by line 408, being pointed at the center of the rectangle 406.

In FIG. 4C the axes $X_{C2}$, $Y_{C2}$, and $Z_{C2}$ represent the axes $X_{C0}$, $Y_{C0}$, and $Z_{C0}$, respectively, after the cross member 318 and the support member 306 are rotated by $U_{X2}$ and $U_{Y2}$, respectively. $T_2$ represents the translation vector $T_0$ after the rotation. The rotation $U_2$ results in the optical axis of the light projector 110, represented by line 408, being pointed at the center of the rectangle 408.

Illustrative Calibration

As discussed above, the position controller module 130 may provide control signals to aim the $Z_C$-axis 334 at an "offset" target location such that the optical axis 208 is aimed at an intended target location. The calibration module 134 may be employed to correct for the offset between the optical axis 208 and the $Z_C$-axis 334. In some instances, the optical axis 208 and the $Z_C$-axis 334 may not be coplanar, and in such instances, the calibration module 134 may be employed to correct for the alignment of the optical axis 208 relative to the $Z_C$-axis 334.

In some embodiments, the optical axis 208 may be aligned along the $Z_C$-axis 334. In such embodiments, the position controller module 130 might not need to employ an "offset" target location in order to aim the optical axis 208 at an intended target location. However, while it may be possible, in theory, to align the optical axis 208 along the $Z_C$-axis 334, it may be difficult in practice to initially align and to maintain precise alignment of the optical axis 208 along the $Z_C$-axis 334. The calibration module 134 may be used to correct for the misalignment of the optical axis 208 with the $Z_C$-axis 334, e.g., the optical axis 208 and the $Z_C$-axis 334.

Figure 5:
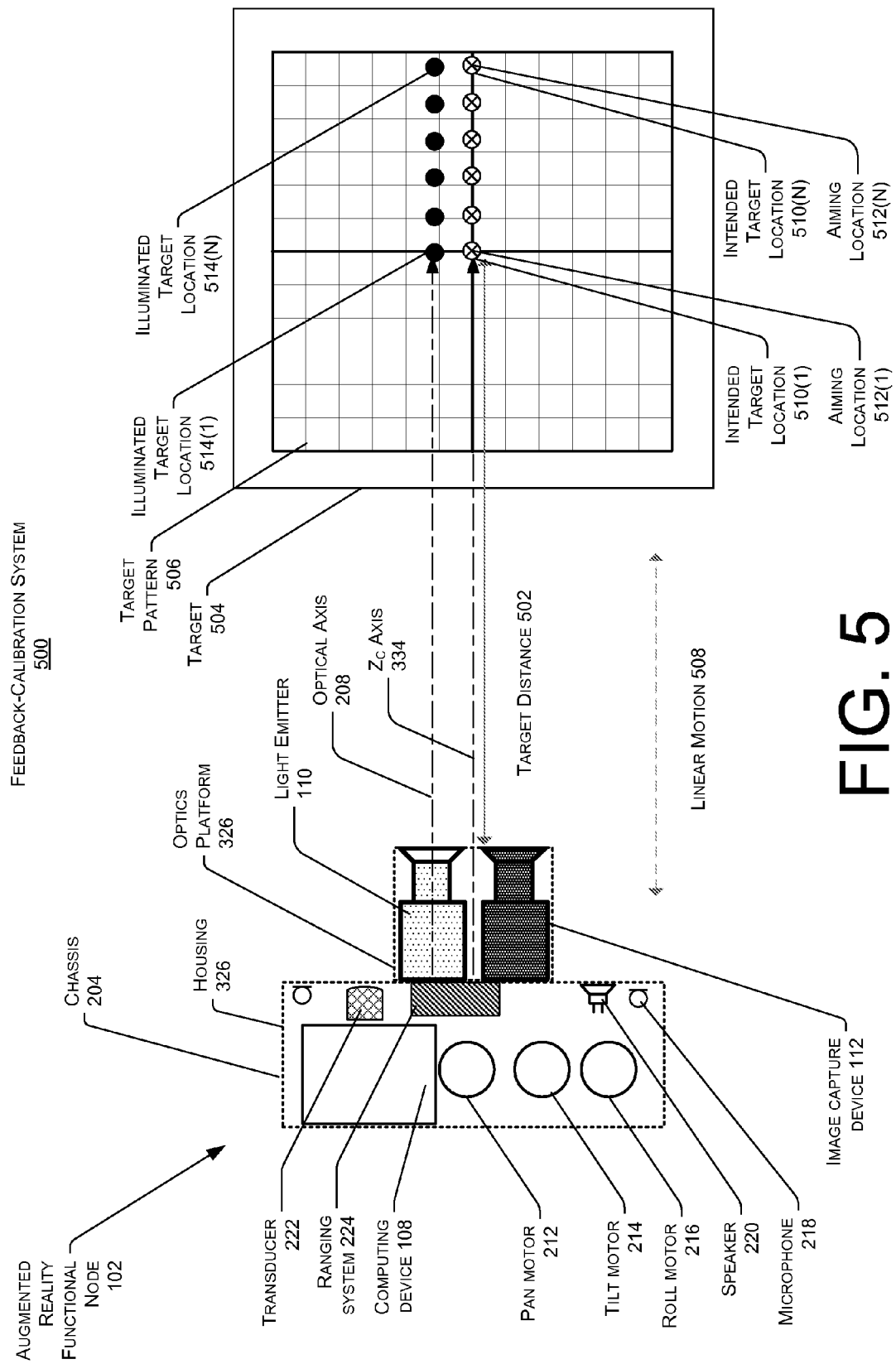
FIG. 5 illustrates an example light projector feedback-calibration system.
Figure 6A:
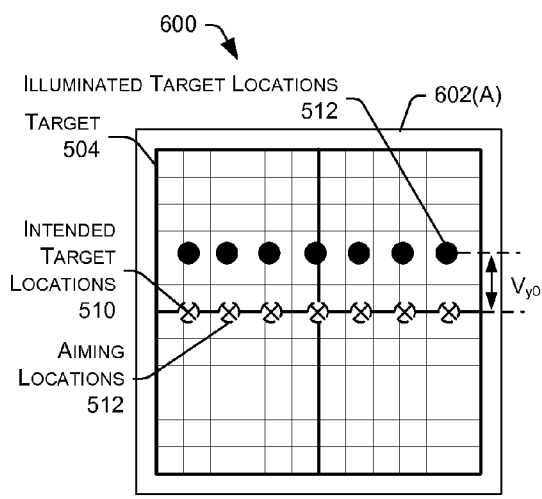
FIGS. 6A-6C and 7A-7C illustrate series of acquired images.
Figure 7A:
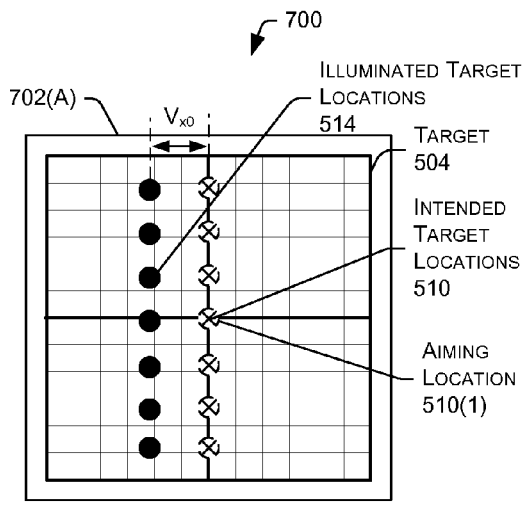
Figure 6B:
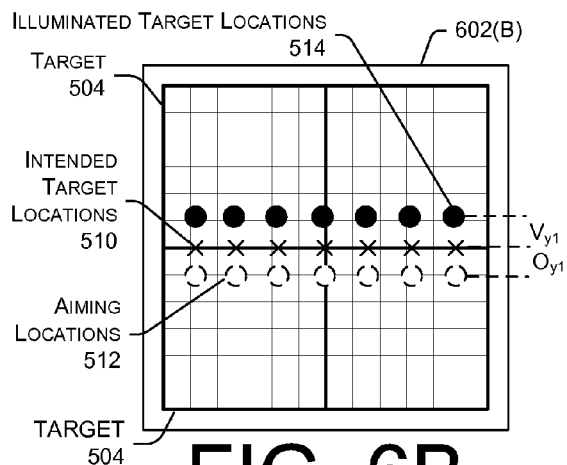
Figure 7B:
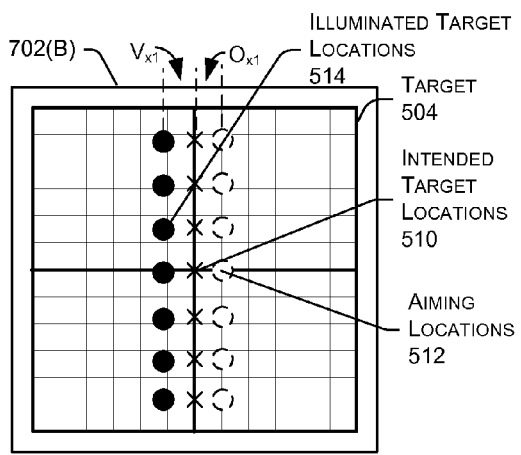
Figure 6C:
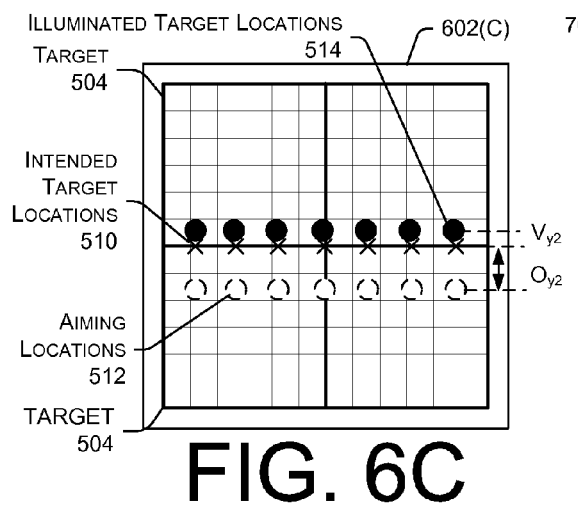
Figure 7C:
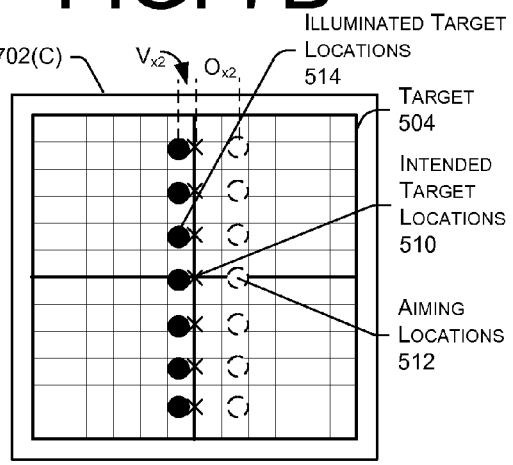

FIG. 5 shows an illustrative light projector feedback-calibration system 500 in which the position controller module 130 is calibrated to aim the structured light 114 at an intended target.

A target distance 502 separates the ARFN 102 from a target 504. The target distance 502 may be measured between a designated point relative to the ARFN 102 and a designated point relative to the target 504. For example, from a front edge of the optics platform 326 to the center of the target 504.

The target 504 comprises a substrate and one or more structural elements configured to present a target pattern 506. The target 504 may be placed at the target distance 502 such that the entire target pattern 506 is within the light projector field of view 206 and/or the image sensor field of view 210.

The target pattern 506 is configured to be visualized by the image sensor field of view 210. For example, if the image sensor field of view 210 operates in infrared wavelengths, the target pattern 506 is configured to provide an image in those infrared wavelengths. The target pattern 506 comprises one or more features arranged in a known configuration. For example, a grid target pattern 112 comprising an array of vertical lines and an array of horizontal lines is shown here. However, in some instances, the target pattern 506 may comprise one or more reference marks.

However, in some instances, the target 504 may not include any target pattern. The target 504 may be of known size, shape and configuration. The calibration module 134 may determine one or more reference points based at least on the known size, shape and configuration.

The ARFN 102 may be configured to move in a linear motion 508 along the tracks 304. The linear motion 508 between the target 504 and the ARFN 102 allows for changes in pose during the calibration process. For example, ARFN 102 may be moved towards or away from the target 504 by actuating one or more motors. The ARFN 102 may be moved toward the target 504 such that the target distance is approximately minimum distance of the light projector field of view 206 and/or the image sensor field of view 210.

While the ARFN 102 is shown as having the linear motion 508, in some implementations the target 504 may have the linear motion 508 while the ARFN 102 may remain stationary. In another implementation both the ARFN 102 and the target 504 may be configured to move.

The calibration module 134 is configured to generate calibration data for the position controller module 130. This calibration data may be based at least in part on images of the target 504 as acquired by the image sensor 112 as the ARFN 102 is positioned in different poses. The different poses result from control of one or more of the pan motor 212, the tilt motor 214 and the roll motor 216.

The calibration module 134 is configured to direct the pan motor 212, the tilt motor 214 and the roll motor 216 to move ARFN 102 into pre-determined poses. For example, the calibration module 134 may direct one or more of the pan motor 212, the tilt motor 214 and the roll motor 216 to scan the optical axis 208 across the target 504 in one or more directions.

The light emitting device 110 may be used to provide known or controlled illumination of the target 504 during a calibration process.

In the instant illustration, multiple intended target locations 510(1)-510(N), multiple aiming locations 512(1)-512(N), and multiple illuminated target locations 514(1)-514(N) are shown. In some instances, the intended target locations 510 and the aiming locations 512 may coincide during the calibration process.

In some implementations, the calibration module 134 aims the $Z_C$-axis 334 at one of the aiming locations 512 (e.g., 512(N)) and light from the light projector 110 is incident on the target 504 at a corresponding illuminated target location 514(1). The calibration module 134 may record pose data for the ARFN 102, which may include one or more of the current target distance 502, a pitch setting (i.e., an amount of rotation about the $X_C$-axis 332), and a yaw setting (i.e., an amount of rotation about the $Y_C$-axis 316). The image sensor 112 may capture an image of the target 504 in which the illuminated target location 514(1) is shown. The calibration module 134 may associate the captured image with the recorded pose data. The calibration module 134 may repeat the process such that the $Z_C$-axis 334 is aimed at a different one of the aiming locations 512 (e.g., 512(N)), light from the light projector 110 is incident on the target 504 at a corresponding illuminated target location 514(N), a corresponding image of the target 504 in which the illuminated target location 514(N) is shown, and the captured image is associated with the corresponding pose data.

In some implementations, the calibration module 134 may scan across the target 504 such that the $Z_C$-axis 334 is aimed at each one of the aiming locations 512 and each of one of the corresponding illuminated target locations 514 is marked on the target 504, and the calibration module 134 may record pose data for the corresponding aiming locations 512. The image sensor 112 may capture at least one image of the target 504 in which one or more of the markers of the illuminated target locations 514 are shown.

FIGS. 6A-6C and 7A-7C illustrate a series 600 and 700, respectively, of acquired images 602(A)-602(C) and 702(A)-702(C), respectively, of the target 504 at different times during a calibration process. In series 600, the calibration module 134 scans across the target 504 in a first scan direction, which may be generally horizontal, and in series 700, the calibration module 134 scans across the target 504 in a second scan direction, which may be generally vertical.

The image 602(A) shows that each illuminated target location 512 is displaced from the corresponding intended target location 510 by a displacement amount $V_{y0}$ when the aiming locations 512 are not offset from the intended targeting locations 510. Similarly, the image 702(A) shows that each illuminated target location 512 is displaced from the corresponding intended target location 510 by a displacement amount $V_{x0}$ when the aiming locations 512 are not offset from the intended targeting locations 510.

The image 602(B) shows that each illuminated target location 512 is displaced from the corresponding intended target location 510 by a displacement amount $V_{y1}$ when the aiming locations 512 are offset from the intended targeting locations 510 by a targeting offset $O_{y1}$. Similarly, the image 702(B) shows that each illuminated target location 512 is displaced from the corresponding intended target location 510 by a displacement amount $V_{x1}$ when the aiming locations 512 are offset from the intended targeting locations 510 by a targeting offset $O_{x1}$.

The image 602(C) shows that each illuminated target location 512 is displaced from the corresponding intended target location 510 by a displacement amount $V_{y2}$ when the aiming locations 512 are offset from the intended targeting locations 510 by a targeting offset $O_{y2}$. Similarly, the image 702(C) shows that each illuminated target location 512 is displaced from the corresponding intended target location 510 by a displacement amount $V_{x2}$ when the aiming locations 512 are offset from the intended targeting locations 510 by a targeting offset $O_{x2}$.

The calibration process may be an iterative process in which the calibration module 134 receives feedback and adjusts a targeting offset, e.g., ($O_x$, $O_y$), based at least in part on the feedback. For example, after an initial calibration scan in the first direction, the calibration module 134 may determine a first iteration targeting offset, e.g., $O_{y1}$, based at least in part on the displacement amount $V_{y0}$. The calibration module 134 may do a subsequent calibration scan in the first direction and may determine a second iteration targeting offset, e.g., $O_{y2}$, based at least in part on the displacement amount $V_{y1}$. After a number of iterations, the calibration module 134 may determine whether the current displacement amount $V_{yn}$ is less than a threshold amount, and if so, the calibration module 134 may cease doing calibration scans in the first direction.

In the above example, calibration scans in the first direction were discussed. The calibration module 134 may perform the same or similar calibration scans in the second direction.

In some instances, the calibration module 134 may do calibration scans that are in a direction that is a linear combination of the first and second directions, e.g., the calibration scan may be generally diagonal across the target 504.

Figure 8:
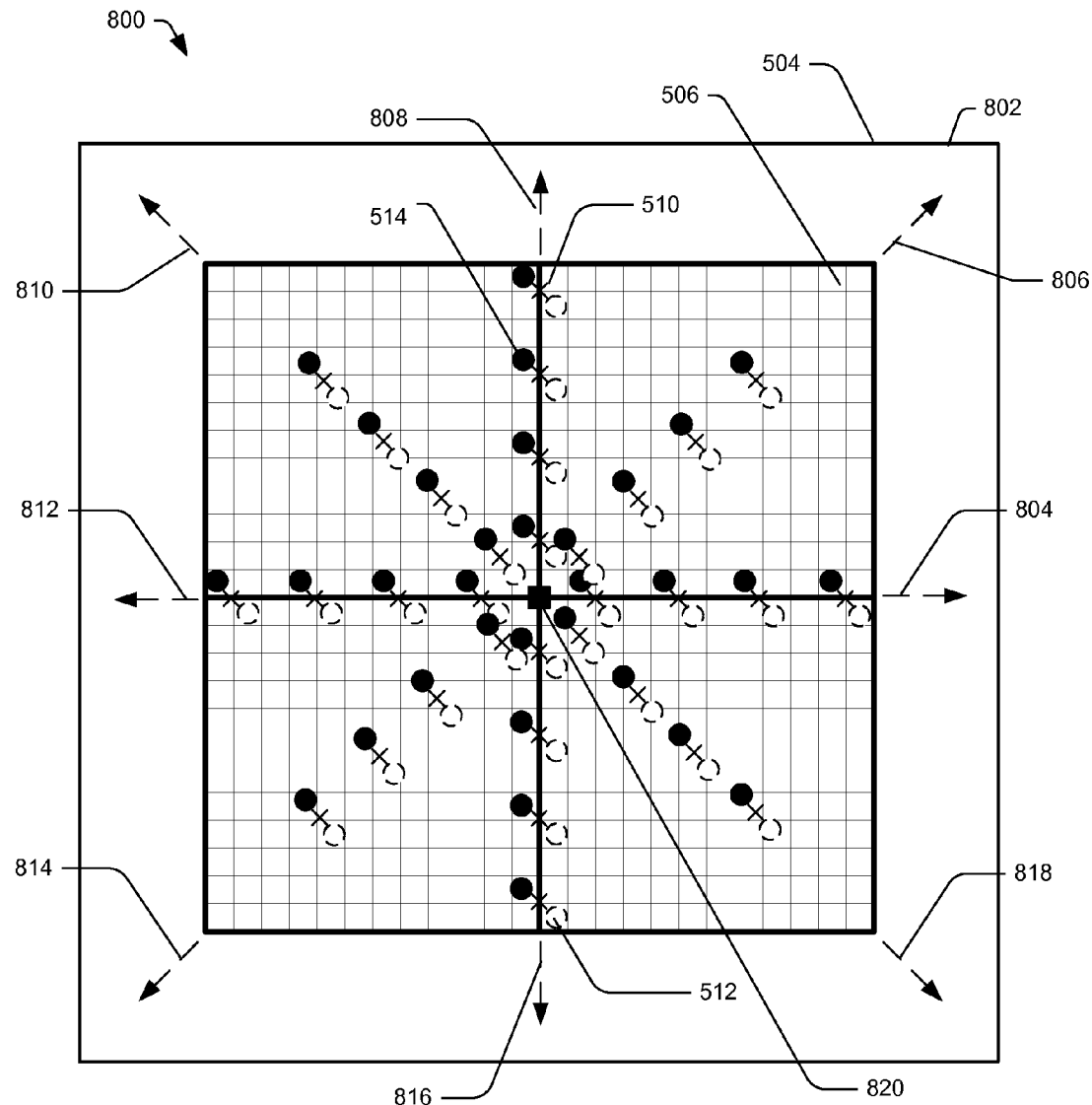
FIG. 8 illustrates an acquired image.

FIG. 8 illustrates an image 802 of the target 504 after a calibration process in which eight scans were performed. The eight scans are represented by arrows 804-818, respectively.

The image 802 shows a reference point 820, which may be located at a center of the target 504. The calibration module 134 aimed the $Z_C$-axis 334 at the reference point 820 and commenced with the first scan in the direction shown by arrow 804. At the end of the first scan, the calibration module 134 rotated the chassis 204 such that the $Z_C$-axis 334 was re-aimed at the reference point 820 and then commenced with the second scan in the direction shown by arrow 806 and so on, until scans in each of the eight directions represented by arrows 804-818 was completed.

Illustrative Calibration Process

The processes described in this disclosure may be implemented by the devices described herein, or by other devices. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other devices as well.

Figure 9:
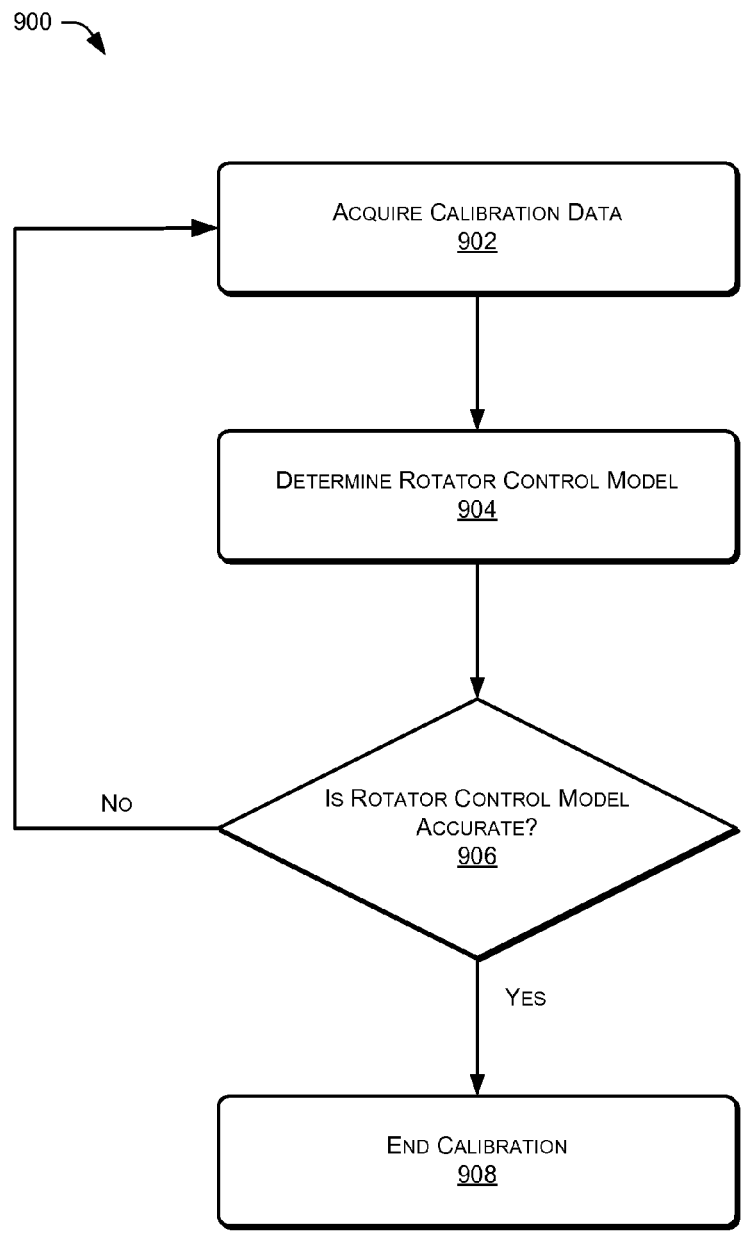
FIG. 9 is an example process of determining a rotator control model.

FIG. 9 is an example process 900 of determining a rotator control model with an automated system. The process 900 may be repeated using distinct poses to gather calibration data across these poses and may be repeated using different target distances.

At 902, calibration data is acquired by the calibration module 134. The calibration data may include one or more images of the target 504 and may include pose data. The calibration module 134 may determine the target distance between the ARFN 102 and the target 504. At the current target distance, the calibration module 134 may perform one or more calibration scans across at least a portion of the target 504. For each calibration scan, the calibration module 134 may aim the $Z_C$O-axis 334 at one or more aiming locations 512, record pose data such as the current target distance 502, the current pitch setting (i.e., the amount of rotation about the $X_C$-axis 332), and the current yaw setting (i.e., the amount of rotation about the $Y_C$-axis 316), illuminate one or more illuminated target locations 512 with the light projector 110, and capture, with the image sensor 112, one or more images 602, 702 of the target 504. The calibration data may be stored in the system parameter datastore 138.

At 904, the calibration module 134 may determine a rotator control model based at least on the calibration data. The calibration module 134 may analyze the captured images 602, 702 with the pose data and determine the rotator control model that fits the calibration data. The calibration module 134 may apply statistical algorithms such as least square fit to determine the rotator control model.

At 906, the calibration module 134 may determine whether the current rotator control model is accurate. In some implementations, the calibration module 134 may determine by minimizing the equation:

$$e=\|v-f(u)\|,$$

where v is a vector denoting the displacement between an aiming target location 512 and a corresponding illuminated target location 514, u is a vector denoting rotations about $X_C$-axis 332 and the $Y_C$-axis 316, and where f(u)=v.

If the determination is that the current rotator control model is not accurate, the process returns to 902.

If the determination is that the current rotator control model is accurate, the process continues at 908 and the calibration module 134 ends calibration of the ARFN 102. The calibration module 134 may store the current rotator control model in the systems parameters datastore 138.

In some implementations, an approach for determining the rotator control model may be as follows:

Define the chassis coordinate system 402, i.e., $X_C$-axis 332, $Y_C$-axis 316, $Z_C$-axis 334, a light projector coordinate system ($P_0$) 404, and an image sensor coordinate system R.

Define a controller input vector $u=(u_x, u_y)^T$, where $u_x$ is the rotation angle about the $X_C$-axis 332 and $u_y$ is the rotation angle about the $Y_C$-axis 316.

Define a vector Q(x, y, z) from the origin of the light projector coordinate system ($P_0$) 404 to an aiming location 512 such as a center of the target 504.

Define a vector P(x, y, z) from the origin of the light projector coordinate system ($P_0$) 404 to the corresponding illuminated target location 514 on the target 504.

Define a vector $v=(v_x, v_y)^T$ as the observation disparity between the vectors P(x, y, z) and Q(x, y, z) in the light projector coordinate system $P_0$.

Let $T_{rp}$ be a matrix transformation from the image sensor coordinate system R to the light projector coordinate system $P_0$, and let $D(x, y, z)$ be the aiming location 512 with respect to the image sensor coordinate system R.

Then, $Q = T_{rp} D$.

Denote a vector m as $m = (Q, P)^T$.

Then, the vector v is related to m by the function H, where H is an angular computation between P and Q the light projector coordinate system $P_0$. In some instances, knowledge of the chassis 204 may be utilized to approximate the disparity between the illuminated target location 514 and the aiming location 512. For example, when the light projector coordinate system ($P_0$) 404 and the chassis coordinate system 402 are aligned as illustrated in FIG. 4A, the disparity between the illuminated target location 514 and the aiming location 512 may be approximated by a constant 2D vector $(T_{x0}, T_{y0})$. This may provide an initial v vector to solve for u vector as approximately as $u = F(v)$.

A relationship between the controller input vector u and the observation disparity vector v may be created by the function F, and a model for F may be computed by employing a sequence of control input vectors u and a corresponding sequence of observation disparity vectors v. To compute F, a function f is found such that the function f satisfies $v_{calc} = f(u)$, where $v_{calc}$ are calculated disparities, and such that $e = \|v - f(u)\|$ is minimal Once the above conditions are met, the function F may be determined by finding the inverse of the function f, i.e., $F = f^{-1}$.

Figure 10:
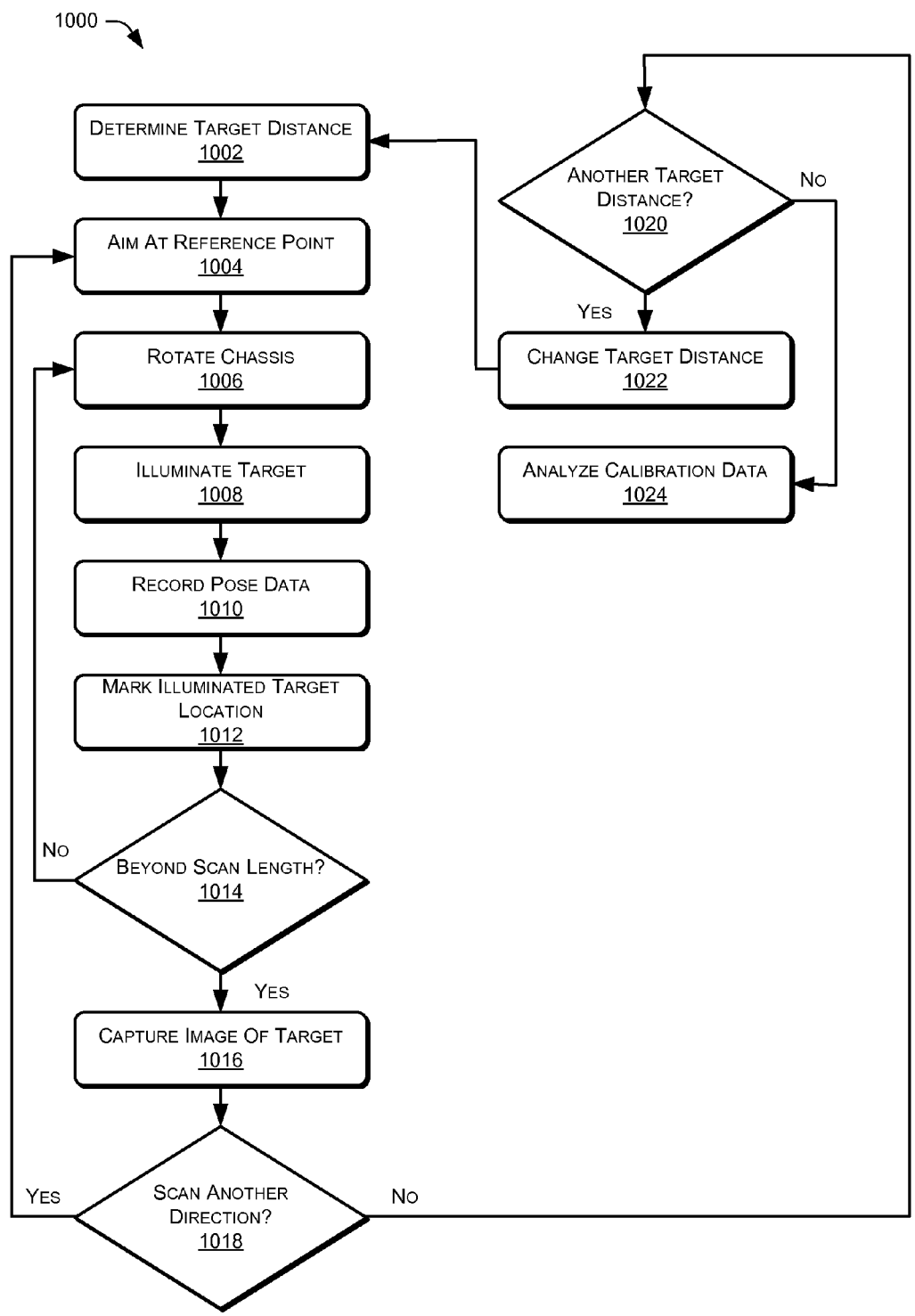
FIG. 10 is another example process of determining a rotator control model.

FIG. 10 is another example process 1000 of determining a rotator control model. The process 1000 may be repeated using distinct calibration scans to gather calibration data across these calibration scans and may be repeated using different target distances.

At 1002, a target distance 502 is determined. The calibration module 134 may employ the ranging system 224 to find the target distance 502.

At 1004, the calibration module 134 may aim the $Z_C$-axis 334 at a reference point such as a center of the target 504. The calibration module 134 may illuminate a target location 514 with light from the light projector 110. The illuminated target location 514 may be marked and pose data for the ARFN 102 may be recorded.

At 1006, the calibration module 134 may rotate the chassis 204. The calibration module 134 may provide control signals to one or more of the pan motor 212, the tilt motor 214, and the roll motor 216 to rotate the chassis 204. The rotation of the chassis 204 aims the $Z_C$-axis 334 at a current aiming location 512.

At 1008, the calibration module 134 may illuminate an illuminated target location 514 corresponding to the current aiming location 512 with light from the light projector 110.

At 1010, the calibration module 134 may record pose data for the ARFN 102. The pose data may be stored in the systems parameters datastore 138.

At 1012, the illuminated target location 514 may be marked. The illuminated target location 514 may be marked such that the illuminated target location 514 is visible to the image sensor 112. For example, the image sensor 112 may be an infra-red device and the illuminated target location 514 may be marked with infra-red marker.

At 1014, the calibration module 134 may determine whether the current aiming location 514 is beyond a maximum calibration scan length. In some instances, the calibration module 134 may determine the maximum calibration scan length based at least on a number of rotations. In some instances, the calibration module 134 may determine the maximum calibration scan length based at least on the image sensor field of view 210 relative to the calibration reference point in block 1004.

If the current aiming location 514 is not beyond the maximum calibration scan length, the process returns to block 1006, and otherwise, the process continues at block 1016.

At 1016, the calibration module 134 may capture an image 602, 702 of the target 504 with the image sensor 112. The captured image 602, 702 may show markers for the illuminated target locations 514.

At 1018, the calibration module 134 may determine whether to scan the target 504 in another direction. In some instances, the calibration module 134 may to scan the target 504 in at least two directions. In some instances, the calibration module 134 may to scan the target 504 in four directions, and each of the four directions, in some instances, may be either orthogonal or anti-parallel to the other directions. In some instances, the calibration module 134 may to scan the target 504 in eight directions, and each of the eight directions, in some instances, may be separated from the next direction by forty-five degrees.

If the calibration module 134 determines there is another scanning direction, the process returns to block 1004, and if not, the process continues at block 1020.

At 1020, the calibration module 134 may determine whether to scan the target 504 with another target distance 502.

If the calibration module 134 determines to scan the target 504 at another target distance 502, the process continues at block 1022, and if not, the process returns to block 1024.

At 1022, the target distance 504 is changed. In some instances, the ARFN 102 may be moved relative to the target 504. In some instances, the target 504 may be moved relative to the ARFN 102. In some instances, both the ARFN 102 and the target 504 may be moved. The process then continues at 1002.

At 1024, the calibration module 134 analyzes the calibration data to determine the rotator control model. The calibration module 134 may correlate the pose data with the corresponding illuminated target locations 514. Using the pose data and the captured image(s), the calibration module 134 may determine calibration data comprising u vectors (i.e., rotations about $X_C$-axis 332 and the $Y_C$-axis 316) and corresponding v vectors (displacement between an aiming target location 512 and a corresponding illuminated target location 514). The calibration module 134 may determine the rotator control model base at least on a best fit for the calibration data.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   a platform having at least two rotational degrees of freedom and carrying an image sensor and a light projector, the image sensor having an associated field of view and configured to capture one or more images, the light projector having an associated optical axis and configured to illuminate at least a portion of a target located in the field of view of the image sensor, wherein the field of view of the image sensor and the optical axis of the light projector move in accordance with rotations of the platform;

one or more processors; and
one or more non-transitory computer-readable media storing computer-executable instructions that, when executed by the one or more processors, cause the one or more processors to perform acts comprising:
  positioning the platform in multiple positions relative to the target to illuminate a sequence of target locations by the light projector;
  capturing, by the image sensor, at least one image of the target, the at least one image including information regarding the sequence of target locations on the target that were illuminated by the light projector;
  for individual positions of the multiple positions, determining pose data for the platform, the pose data being indicative of rotational values for the two rotational degrees of freedom of the platform while the platform is at the respective position;
  determining a correlation between the sequence of target locations and the pose data for the multiple positions; and
  using the correlation to control rotations of the platform about the two rotational degrees of freedom.

2. The system of claim 1, the acts further comprising:
illuminating the sequence of target locations with light emitted from the light projector; and
for each position of the platform and target location of the sequence, recording corresponding pose data for the platform.

3. The system of claim 1, the acts further comprising:
identifying an illuminated target location from the at least one image;
identifying an aiming location on the target corresponding to the illuminated target location based at least in part on the pose data of the platform;
determining a disparity between the aiming location and the illuminated target location.

4. The system of claim 3, wherein the illuminated target location is a first illuminated target location, the aiming location is a first aiming location, the disparity is a first disparity, and the acts further comprise:
determining whether the first disparity is greater than a threshold amount;
responsive to the first disparity being greater than the threshold amount:
  identifying a second illuminated target location from the at least one image;
  identifying a second aiming location on the target corresponding to the second illuminated target location based at least in part on the pose data of the platform; and
  determining a second disparity between the second aiming location and the second illuminated target location.

5. The system of claim 1, wherein the platform is a gantry platform having a base, a first member rotatably coupled to the base and a second member rotatably coupled to the first member, wherein the first member rotates about a first axis corresponding to a first degree of freedom of that at least two degrees of freedom of the platform, and wherein the second member rotates about a second axis corresponding to a second degree of freedom of that at least two degrees of freedom of the platform.

6. The system of claim 5, further comprising:
a pan motor that drives the first member in a yaw motion; and
a tilt motor that drives the second member in a pitch motion.

7. The system of claim 1, the acts further comprising:
identifying a plurality of illuminated target locations from the at least one image;
for each illuminated target location of the plurality of target locations, identifying a corresponding aiming location on the target based at least in part on the pose data of the platform; and
for each illuminated target location of the plurality of target locations, determining a disparity between the aiming location and the illuminated target location.

8. The system of claim 7, wherein the pose data for the platform comprises a plurality of input vectors, each input vector corresponding to an aiming target location, and wherein correlating the sequence of target locations with the pose data comprises determining a best fit for the plurality of input vectors and the disparities between the plurality of illuminated target locations and the corresponding aiming target locations.

9. The system of claim 7, wherein the correlation is a first correlation, the sequence of target locations on the target is a first sequence of target locations, and the pose data is first pose data, and the acts further comprise:
positioning the platform in multiple additional positions relative to the target to illuminate a second sequence of target locations by the light projector;
acquiring at least one additional image, captured by the image sensor, of the target, the at least one additional image including information regarding the second sequence of target locations on the target;
for each of the multiple additional positions, determining pose data for the platform;
determining a second correlation between the second sequence of target locations and the pose data for the multiple additional positions, and
using the second correlation to control rotations of the platform about the two degrees of freedom.

10. A method comprising:
providing control signals to position a platform in multiple positions, wherein the platform has at least two rotational axes and carries an image sensor having an associated field of view of a target and a light projector having an associated optical axis, and wherein the field of view of the image sensor and the optical axis of the light projector move in accordance with rotations of the platform;
capturing, by the image sensor, at least one image of the target, the at least one image including information regarding a sequence of target locations on the target that were illuminated by the light projector at the multiple positions;
for individual positions of the multiple positions, acquiring pose data for the platform comprising rotational values for the two rotational degrees of freedom of the platform while the platform is positioned at the respective position;
determining a correlation between the sequence of target locations and the pose data for the multiple positions; and
using the correlation to control rotations of the platform about the two rotational degrees of freedom.

11. The method of claim 10, further comprising:
illuminating the sequence of target locations with light emitted from the light projector; and
for each position of the platform and target location of the sequence, recording corresponding pose data for the platform.

12. The method of claim 10, wherein the correlating the sequence of target locations with the pose data comprises:
  identifying an illuminated target location from the at least one image;
  identifying an aiming location on the target corresponding to the illuminated target location based at least in part on the pose data of the platform;
  determining a disparity between the aiming location and the illuminated target location.

13. The method of claim 12, wherein the illuminated target location is a first illuminated target location, the aiming location is a first aiming location, the disparity is a first disparity, and further comprising:
  determining whether the first disparity is greater than a threshold amount;
  responsive to the first disparity being greater than the threshold amount:
    identifying a second illuminated target location from the at least one image;
    identifying a second aiming location on the target corresponding to the second illuminated target location based at least in part on the pose data of the platform;
    determining a second disparity between the second aiming location and the second illuminated target location; and
    correlating the sequence of target locations with the pose data based at least in part on the second disparity.

14. The method of claim 10, wherein the correlating the sequence of target locations with the pose data comprises:
  identifying a plurality of illuminated target locations from the at least one image;
  for each illuminated target location of the plurality of target locations, identifying a corresponding aiming location on the target based at least in part on the pose data of the platform;
  for each illuminated target location of the plurality of target locations, determining a disparity between the aiming location and the illuminated target location.

15. The method of claim 14, wherein the pose data for the platform comprises a plurality of input vectors, each input vector corresponding to an aiming target location, and wherein the correlating the sequence of target locations with the pose data comprises determining a best fit for the plurality of input vectors and the disparities between the plurality of illuminated target locations and the corresponding aiming target locations.

16. The method of claim 14, wherein the correlation is a first correlation, the sequence of target locations on the target is a first sequence of target locations, and further comprising:
  positioning the platform in multiple additional positions relative to the target to illuminate a second sequence of target locations by the light projector;
  acquiring at least one additional image, captured by the image sensor, of the target, the at least one additional image including information regarding a second sequence of target locations on the target;
  for each of the multiple additional positions, determining pose data for the platform;
  determining a second correlation between the second sequence of target locations and the second pose data for the multiple additional positions; and
  using the second correlation to control rotations of the platform about the two degrees of freedom.

17. One or more non-transitory computer-readable media storing computer-executable instructions that, when executed by one or more processors, cause the one or more processors to perform acts comprising:
  causing a platform to be positioned in multiple positions relative to a target to illuminate a sequence of target locations by a light projector;
  capturing, by an image sensor having an associated field of view, at least one image of the target, the at least one image including information regarding a sequence of target locations on the target that were illuminated by the light projector having an associated optical axis, wherein the platform has at least two rotational degrees of freedom and carries the image sensor and the light projector, and wherein the field of view of the image sensor and the optical axis of the light projector move in accordance with rotations of the platform;
  for individual positions of the multiple positions, determining pose data for the platform comprising rotational values for the two rotational degrees of freedom of the platform while the platform is rotated about at least one of the two rotational degrees of freedom to illuminate a target location of the sequence of target locations;
  determining a correlation between the sequence of target locations and the pose data for the multiple positions; and
  using the correlation to control rotations of the platform about the two rotational degrees of freedom.

18. The one or more non-transitory computer-readable media of claim 17, the acts further comprising:
  illuminating the sequence of target locations with light emitted from the light projector; and
  for each position of the platform and target location of the sequence, recording corresponding pose data for the platform.

19. The one or more non-transitory computer-readable media of claim 17, the acts further comprising:
  identifying an illuminated target location from the at least one image;
  identifying an aiming location on the target corresponding to the illuminated target location based at least in part on the pose data of the platform; and
  determining a disparity between the aiming location and the illuminated target location, wherein the correlation is based at least in part on the disparity.

20. The one or more non-transitory computer-readable media of claim 19, wherein the illuminated target location is a first illuminated target location, the aiming location is a first aiming location, the disparity is a first disparity, and the acts further comprise:
  determining whether the first disparity is greater than a threshold amount;
  responsive to the first disparity being greater than the threshold amount:
    identifying a second illuminated target location from the at least one image;
    identifying a second aiming location on the target corresponding to the second illuminated target location based at least in part on the pose data of the platform;
    determining a second disparity between the second aiming location and the second illuminated target location; and
    calibrating rotations of the platform based at least in part on the second disparity.

21. The one or more non-transitory computer-readable media of claim 17, the acts further comprising:
  identifying a plurality of illuminated target locations from the at least one image;

for each illuminated target location of the plurality of target locations, identifying a corresponding aiming location on the target based at least in part on the pose data of the platform;

for each illuminated target location of the plurality of target locations, determining a disparity between the aiming location and the illuminated target location; and calibrating rotations of the platform based at least in part on the disparities between the plurality of illuminated target locations and the corresponding aiming target locations.

22. The one or more non-transitory computer-readable media of claim 21, wherein the pose data for the platform comprises a plurality of input vectors, each input vector corresponding to an aiming target location, and wherein the correlating the sequence of target locations with the pose data comprises determining a best fit for the plurality of input vectors and the disparities between the plurality of illuminated target locations and the corresponding aiming target locations.

23. The one or more non-transitory computer-readable media of claim 21, wherein the correlation is a first correlation, the sequence of target locations on the target is a first sequence of target locations, and the pose data is first pose data, and the acts further comprise:

positioning the platform in multiple additional positions relative to the target to illuminate a second sequence of target locations by the light projector;

acquiring at least one additional image, captured by the image sensor, of the target, the at least one additional image including information regarding the second sequence of target locations on the target;

for each of the multiple additional positions, determining pose data for the platform;

determining a second correlation between the second sequence of target locations and the second pose data for the multiple additional positions; and using the second correlation to control rotations of the platform about the two degrees of freedom.

* * * * *